United States Patent [19]

Bremner et al.

[11] Patent Number: 5,720,914
[45] Date of Patent: Feb. 24, 1998

[54] METHOD OF PRODUCING A POLYOLEFINIC FILM BY A WATER QUENCH PROCESS

[75] Inventors: David Henry Bremner; Joseph William Simpson Miller, both of Dundee, Scotland

[73] Assignee: Scott & Fyfe Limited, United Kingdom

[21] Appl. No.: 571,982

[22] PCT Filed: Jun. 22, 1993

[86] PCT No.: PCT/GB93/01311

§ 371 Date: Dec. 19, 1995

§ 102(e) Date: Dec. 19, 1995

[87] PCT Pub. No.: WO95/00313

PCT Pub. Date: Jan. 5, 1995

[30] Foreign Application Priority Data

Dec. 20, 1991 [GB] United Kingdom ............. 9127028
Dec. 14, 1992 [EP] European Pat. Off. ......... 92311408

[51] Int. Cl.$^6$ ................ C08J 5/18; C08L 23/12; B29C 47/88
[52] U.S. Cl. ............ 264/178 R; 264/179; 264/237; 425/71
[58] Field of Search ............ 264/178 R, 178 F, 264/179, 180, 233, 237; 425/71, 67, 68, 69, 70; 8/108.1

[56] References Cited

U.S. PATENT DOCUMENTS

| | | | |
|---|---|---|---|
| 2,801,446 | 8/1957 | Wolinski | 264/178 R |
| 4,075,147 | 2/1978 | Thompson. | |
| 4,190,624 | 2/1980 | Alard et al. | 264/178 R |
| 5,006,587 | 4/1991 | Fielding | 524/405 |
| 5,049,223 | 9/1991 | Dais et al. | 156/244.11 |

FOREIGN PATENT DOCUMENTS

| | | | |
|---|---|---|---|
| 0549233 | 6/1993 | European Pat. Off. | |
| 62-152716 | 7/1987 | Japan | 425/71 |
| 1052550 | 12/1966 | United Kingdom | 264/178 R |
| 8202169 | 7/1982 | WIPO. | |

OTHER PUBLICATIONS

Database WPI Week 8732, Derwent Publications Ltd., London GB AN 87-226509 & JP A,62,152 716 (Idemitsu Petrochem.) 7 Jul., 1987.

*Primary Examiner*—Mathieu D. Vargot
*Attorney, Agent, or Firm*—Volpe and Koenig, P.C.

[57] ABSTRACT

A method for producing a polyolefinic film having ultraviolet stabilizers by extruding a hot molten polymer into a water quench bath for solidification of the film. An active halogen is added to the water quench bath in order to reduce the water carryover when the polyolefinic film is withdrawn from the water quench bath.

23 Claims, No Drawings

METHOD OF PRODUCING A POLYOLEFINIC FILM BY A WATER QUENCH PROCESS

BACKGROUND OF THE INVENTION

This invention relates to a method of producing a polyolefinic film by a water quench process.

It is well known that, in the manufacture of polyolefinic film, particularly polypropylene film, the hot molten polymer is extruded into a water quench bath where the film solidifies. The solidified polypropylene film is taken from the bath and passed over a system of Godet rollers before being fed through a hot air oven in which the film is drawn to induce molecular orientation. Commonly the polypropylene film is slit into a plurality of tapes before being passed into the drawing oven.

Polypropylene is a hydrophobic material and therefore, in general, a polypropylene film removed from the water quench bath carries little or no water on its surfaces. However, in order to improve the properties of the polypropylene film for subsequent use it is customary for various additives to be mixed or blended with the polypropylene. The introduction of additives results in a tendency for the polypropylene film to carry over water from the water quench bath with the result that it is necessary to remove this water from the surfaces of the polypropylene film.

Water removal is conventionally effected by providing a period of vertical travel for the polypropylene film in which the water may fall from the film under gravity, and by providing suction slots to suck moisture from the surfaces of the film. It is also known to use scraper bars to assist in the removal of the water from the surfaces of the polypropylene film.

Hindered amines are additives commonly included in polypropylene in order to improve the resistance of the polypropylene to ultraviolet degradation. This is particularly important when polypropylene film is to be used in conditions where it is exposed to strong or continuous sunlight and it is important that the polypropylene does not degrade too quickly. A particular example is where the polypropylene film is to be used in the manufacture of intermediate bulk containers.

It has been found that hindered amines and other UV stabilisers are worse than other additives in promoting water carryover on the surfaces of the polypropylene film removed from a water quench bath. Indeed the water may remain on the surface of the polypropylene film through the Godet rollers, the slitting device, and into the drawing oven. This is most undesirable because the water is present in patches across the width of the polypropylene film and this leads to irregular and inconsistent drawing of the polypropylene film.

In order to ensure that water is removed from the surfaces of the polypropylene film which includes hindered amine UV stabilisers it has been necessary substantially to reduce the rate of advance of the polypropylene film. Of necessity this results in increased manufacturing costs and it is therefore important to reduce, so far as possible, the water carryover effect.

SUMMARY OF THE INVENTION

In accordance with the present invention it has been found that water carryover can be reduced by introducing an active halogen into the water of the water quench bath.

An "active halogen" is a halogen which is present in water at a pH value above 4 as a hypochlorite ion or a hypobromite ion. Such an active halogen is in equilibrium in the water with the elemental halogen, according, for example, to the equations

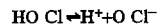

According to the present invention there is provided a method of producing, by a water quench process, a film of a polyolefinic material having a tendency to carry water from the water quench process on the surfaces of the film, which includes the step of introducing an active halogen into the quench water and thereby reducing the quantity of water carried on the surfaces of the film leaving the water quench process.

DESCRIPTION OF THE PREFERRED EMBODIMENTS

More specifically in accordance with the present invention there is provided a method of producing a film of a polypropylene material which includes ultraviolet stabilisers, the method comprising the steps of extruding a film of the molten polypropylene material into a water quench bath to solidify the film, and introducing into the quench water a compound capable of producing hypochlorite ions in the quench water whereby the quantity of water carried over from the water quench bath on the surfaces of the solidified polypropylene film is reduced.

The compound which is introduced into the quench water to reduce water carryover may be in liquid form, for example sodium hypochlorite or bromine water, or solid form, for example an organic compound such as trichloroisocyanuric acid, which reacts with water to produce hypochlorous acid. In the latter case a tablet of the organic compound may be suspended in the water in the water quench bath, or the water in a separate small feeder tank in the circulation system of the quench water, so that the tablet slowly dissolves in the quench water. Some turbulence in the water assists dissolving of the tablet.

It has been found that a good reduction in water carryover on the surfaces of a polypropylene film which includes hindered amine ultraviolet stabilisers is obtained when the quantity of active halogen in the quench water is maintained at a level of at least 4 parts per million, preferably in the range of 4 to 12 parts per million. Higher quantities of active halogen in the quench water do not adversely affect water carryover, but do not further enhance the reduction in water carryover and are therefore unnecessary.

The use of active halogen in the quench water can enable increases in the rate of advance of a polypropylene film containing hindered amine UV stabilisers of as much as 30% or more to be obtained without difficulties arising from water carryover into the drawing oven.

It is important in accordance with the present invention that the halogen be present in the quench water as active halogen and not as the halide ion. Introduction of chloride ions into the quench water by dissolving common salt in the water has been found to produce no reduction in the water carryover effect by polypropylene film containing hindered amine ultraviolet stabilisers.

The use of an active halogen such as active chlorine in the quench water has the additional advantageous effect of preventing the build-up of micro-organisms on all metal surfaces exposed to the quench water and particularly on the surfaces of the heat exchanger normally included to control the temperature of the quench water.

In a specific example in accordance with the present invention molten polypropylene containing hindered amine UV stabilisers is extruded through an 800 mm die at a rate of 28 meters per minute into a water quench bath containing approximately 1500 kg of water in continuous recirculation. The water quench system includes a pump, filter equipment and a heat exchanger for maintaining the temperature of the quench water in the region of 26° C. The polypropylene film has an exposure time to the quench water of approximately 2 seconds. The water quench system additionally includes a small cistern with header control, the cistern being separate from the main quench tank. A 225 gm tablet of trichloroisocyanuric acid is dropped into the cistern at or close to the point of greatest turbulence in the cistern, which is at the outlet from the cistern. Alternatively the tablet may be suspended in a plastic basket or bag near the outlet from the cistern, in which case the tablet may be readily removed if it is found that the active chlorine content of the quench water rises to a level substantially above 12 parts per million.

The tablet slowly dissolves in the water circulating through the cistern producing hypochlorous acid and isocyanuric acid. After approximately seven days running, the exhausted tablet is replaced by a new 225 gm tablet of trichloroisocyanuric acid.

A marked reduction in water carryover by the solidified polypropylene is observed as compared with the carryover in the absence of the tablet.

Tablets of other chlorimides yielding at least 50% available chlorine on dissolution in water, such as dichloroisocyanuric acid or various alkali metal dichloroisocyanurate salts, may be used in accordance with the present invention instead of trichloroisocyanuric acid, as may also similar soluble compounds of bromine. Satisfactory results in reduction of water carryover have also been achieved by introducing into the quench water an amount of 5% aqueous sodium hypochlorite solution to provide 10–12 parts per million of active chlorine in the quench water.

Addition of aqueous sodium hypochlorite solution to the quench water may be used in conjunction with the dissolving of a tablet in the water in order to obtain a quick reduction in water carryover if this is found to be very bad, for example on starting up the extrusion process.

Very good improvements in reduction of water carryover have also been obtained using active bromine. An amount of bromine water was added to the quench bath to provide 10–12 parts per million of active bromine in the quench water quenching extruded polypropylene film. Approximately one minute after the introduction of the bromine water, the carryover of water on the polypropylene film was reduced very markedly. By the use of bromine water, water carryover was reduced until only a few discrete droplets were visible on the quenched polypropylene film and these only intermittently.

Once a desired level of active bromine has been established in the quench water, this level may be maintained by introducing dilute bromine water through a metering pump into the quench water.

It has been found that substituting active iodine for active chlorine or active bromine is not successful in reducing water carryover on extruded polypropylene film.

In an alternative method using a solid compound to provide active halogen in the quench water in accordance with the present invention, the compound in a fine particulate form is made into an aqueous slurry and the slurry is fed by a metering pump such as a gear pump into the quench water in the cistern at the desired rate.

Investigations have shown that, when a polypropylene film having a tendency to carry water from a water quench process has been contacted with an active halogen such as active chlorine, the polypropylene retains an improved hydrophobic property as compared with a similar film which has not been contacted with the active halogen.

We claim:

1. A method for producing a polyolefinic film comprising:
   extruding polyolefinic film having surfaces;
   introducing an active halogen into a quench water bath; and
   quenching the extruded polyolefinic film in the quench water bath having the active halogen thereby reducing the quantity of water carried on the surfaces of the polyolefinic film leaving the quench water bath.

2. A method of producing a film of a polypropylene material which includes hindered amine ultraviolet stabilizers, which comprises the steps of extruding a film of the molten polypropylene material into a water quench bath to solidify the film, and introducing into the quench water a compound capable of producing hypochlorite ions in the quench water whereby the quantity of water carried from the water quench bath on the surfaces of the solidified polypropylene film is reduced.

3. A method according to claim 1 wherein an aqueous solution of sodium hypochlorite is added to the quench water bath.

4. A method according to claim 1 wherein active bromine is added to the quench water bath.

5. A method according to claim 3 wherein from 10 to 12 parts per million of the sodium hypochlorite is present in the quench water bath.

6. A method according to claim 1 wherein there is introduced into the quench water bath sufficient chlorimide to produce at least 4 parts per million of active chlorine in the quench water bath.

7. A method according to claim 1 wherein a chlorimide yielding at least 50% available chlorine on dissolution in water is dissolved in the quench water bath.

8. A method according to claim 6 wherein the chlorimide is trichloroisocyanuric acid.

9. A method according to claim 6 wherein a tablet of the chlorimide is introduced into the quench water bath.

10. A method according to claim 9 wherein the tablet is suspended in the quench water bath.

11. A method according to claim 9 wherein the tablet is dissolved in a side bath or cistern included in a quench water bath circulation system separate from the water quench bath.

12. A method according to claim 1 wherein the active halogen is introduced into the quench water bath at a controlled rate to provide a sufficient amount of the active halogen to reduce the quantity of water carried on the surfaces of the polyolefinic leaving the quench water bath.

13. A method according to claim 12 wherein the active halogen is introduced through a metering pump into the quench water bath.

14. A method according to claim 13 wherein the active halogen is introduced through the metering pump into the quench water bath as a particulate aqueous slurry comprising a compound capable of producing hypochlorite ions.

15. A method according to claim 2 wherein an aqueous solution of sodium hypochlorite is added to the quench water bath.

16. A method according to claim 4 wherein from 10 to 12 parts per million of the bromine is present in the quench water bath.

17. A method according to claim 2 wherein there is introduced into the quench water sufficient chlorimide to produce at least 4 parts per million of active chlorine in the quench water bath.

18. A method according to claim 2 wherein a chlorimide yielding at least 50% available chlorine on dissolution in water is dissolved in the quench water bath.

19. A method according to claim 6 wherein a chlorimide yielding at least 50% available chlorine on dissolution in water is dissolved in the quench water bath.

20. A method according to claim 17 wherein the chlorimide is trichloroisocyanuric acid.

21. A method according to claim 7 wherein a tablet of the chlorimide is introduced into the quench water bath to yield at least 50% available chlorine.

22. A method according to claim 8 wherein a tablet of the chlorimide is introduced into the quench water bath.

23. A method according to claim 10 wherein the tablet is dissolved in a side bath or cistern included in a quench water bath circulation system separate from the water quench bath.

* * * * *